Oct. 8, 1957　　　　G. O. CHRISTENSEN　　　2,809,077
SHAFT MOUNTING
Filed July 23, 1954
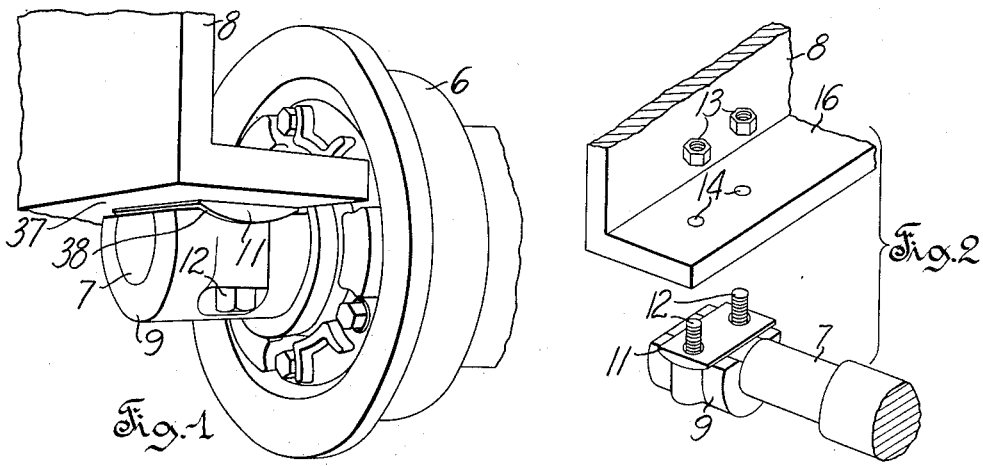
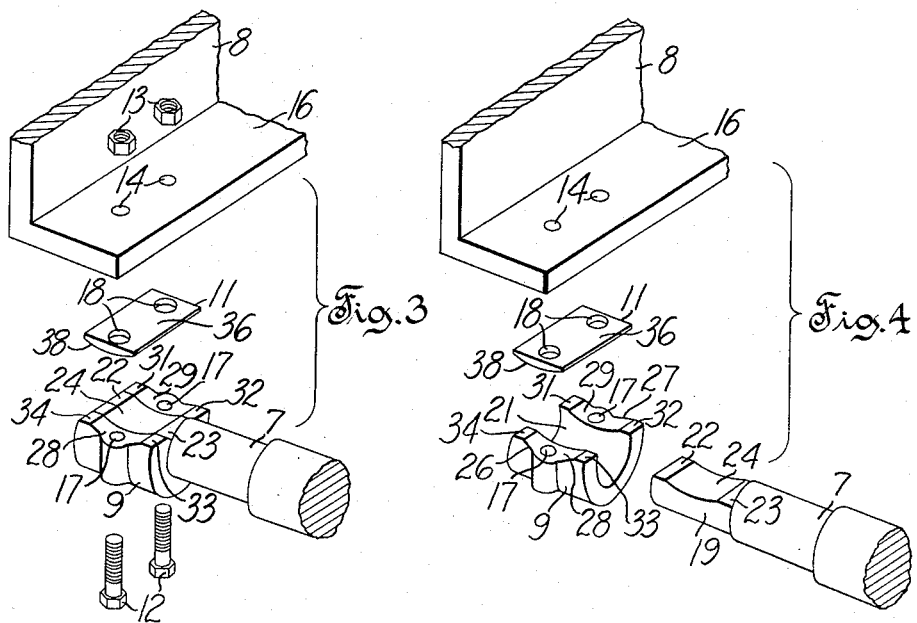
Inventor
George O. Christensen
by Charles L. Schwab
Attorney United States Patent Office 2,809,077
Patented Oct. 8, 1957

2,809,077

SHAFT MOUNTING

George O. Christensen, Springfield, Ill., assignor to Allis-Chalmers Manufacturing Company, Milwaukee, Wis.

Application July 23, 1954, Serial No. 445,278

9 Claims. (Cl. 308—15)

This invention relates to shaft mountings and it is concerned more particularly with the mounting of a shaft on a support, which due to manufacturing variations such as warpage and other causes, does not have the necessary degree of accuracy for mounting a pair of shaft bearings in true alignment with each other.

In truck roller installations for crawler tractors, as shown for instance in U. S. Patent No. 2,568,897, issued September 25, 1951, to E. F. Norelius, wherein a stationary truck roller supporting shaft is secured at its opposite ends to the underside of a pair of rolled section channel members of a track frame, it has been found that the bottom mounting surfaces of these rolled section channel members will not always be coplanar. The noncoplanar relationship of these bottom mounting surfaces of the channel members of an assembled track frame may be due to the tolerances allowed in manufacturing rolled stock and may also be due to distortions introduced in handling or in securing the channel members together to form the track frame.

When a truck roller shaft is secured to noncoplanar bottom surfaces of the track frame channel members, several problems are encountered. When mounting brackets at opposite ends of the shaft are drawn up tight against the noncoplanar bottom surfaces on the channel members, the shaft becomes subject to bending or deflection and, as a result, undesirable stresses may be set up in the shaft. When the shaft bends under these stresses so that it will no longer be straight, it has been found that the bearings which support the truck roller on the shaft become worn at an accelerated rate. Also, the truck roller shafts are apt to fail prematurely under load due to the additional stresses introduced in mounting them securely to the noncoplanar mounting surface on the channel members as previously mentioned.

Machining of the bottom mounting surfaces of the channel members of the track frame so as to provide for stress free mounting of the truck roller shafts would involve additional manufacturing costs and for that reason be undesirable from a practical standpoint. Also, the machining of the bottom mounting surface may remove sufficient material to objectionably weaken the member, thereby necessitating the use of a heavier and more expensive channel than would otherwise be required. Further, it has been found that the track frames of a crawler tractor may be distorted in use and thus, even if the bottom surfaces are machined flat initially, there is no insurance against the shaft being later deflected by distortion of the track frame during use.

Generally, it is an object of this invention to provide an improved self-aligning shaft mounting which takes care of the hereinbefore mentioned difficulties and requirements in a practical and entirely satisfactory manner.

More specifically, it is an object of this invention to provide an improved truck roller shaft mounting which will compensate for misalignment of shaft mounting surfaces on rolled section channel members of a track frame and thereby provide a mounting for the truck roller shaft without objectionably deflecting or bending it.

A further object of this invention is to provide an improved mounting for a truck roller shaft which will protect the shaft against undue bending when the channel members, which support it, become distorted in use.

A further object of this invention is to provide an improved truck roller shaft mounting of the hereinbefore outlined character wherein the shaft is secured against axial movement and acts as a brace between the supporting channel members.

A further object of this invention is to provide an improved truck roller shaft mounting which gives satisfactory service, eliminates excessive wear of truck roller bearings, is easy to install and remove and is economical to manufacture.

These and other objects and advantages of this invention will be evident when the following description is read in conjunction with the accompanying drawings, in which:

Fig. 1 is a perspective view of part of a truck roller installation for crawler tractors;

Fig. 2 is a partially exploded view of parts shown in assembly in Fig. 1;

Fig. 3 is a more completely exploded view of the parts shown in Fig. 2; and

Fig. 4 is a still further exploded view of parts shown in Fig. 3.

Referring to Fig. 1 of the drawings, a truck roller 6, partially shown, for an endless self-laying track unit is conventionally mounted by antifriction bearings, not shown, on a truck roller shaft 7 which, in turn, is nonrotatably supported at its ends by a pair of rigidly interconnected rolled section channel members 8, only one of which is shown. Details of the mounting of the truck roller 6 on the shaft 7 are shown in the beforementioned U. S. Patent No. 2,568,897. As shown in Fig. 1, one end of the shaft 7 is mounted on the support 8 by a C-shaped bracket 9, and a seat or adapter plate 11 is operatively interposed between the lower side of the supporting channel member 8, and the upper side of the bracket 9. The bracket and adapter plate are secured to the channel member 8 by a pair of fastening elements or bolts 12 and nuts 13 (see Fig. 3). As shown in Fig. 1, the truck roller shaft 7 is nonrotatably secured to the support or channel member 8; however, as will be explained more fully hereinbelow, the mounting is such as to allow limited vertical tilting of the shaft relative to the channel member 8.

Referring to Fig. 2, the nuts 13 have been removed from the bolts 12 and the bolts have been withdrawn from holes 14 formed in the horizontally disposed flange 16 of channel member 8, thus allowing the shaft 7, bracket 9 and adapter plate 11 to be removed from the channel member 8, as shown.

Referring to the exploded view in Fig. 3, the bolts 12 have been withdrawn from holes 17 formed in the bracket 9 and from holes 18 formed in the adapter plate 11. The holes 18 formed in the adapter plate 11 are substantially larger than the shanks of the bolts 12 so that the latter will have more side clearance in the adapter plate 11 than in the bracket 9 and flange 16.

Referring to Figs. 3 and 4, the shaft 7 has a reduced diameter attaching portion 19 which nonrotatably bears upon a radially inward facing complementary bearing surface 21 formed on the C-shaped bracket 9. The attaching portion 19 of the shaft 7 is concaved crosswise to form a cylindrically arcuate recess 24 leaving a pair of coplanar flats 22 and 23 on opposite sides of the arcuate recess 24. The circumferentially spaced end portions 26 and 27 of C-shaped bracket 9 present a pair of cylindrically arcuate recesses 28 and 29, respectively, and the circumferentially spaced end portions of the C-shaped bracket 9 present two pairs of coplanar flats, these being designated 31, 32, 33 and 34. As shown in Fig. 3, the recesses 24, 28 and 29 are aligned end to end transversely of the shaft 7 and they are generally symmetrical about a plane at right angles to the shaft 7. Conjointly, the recesses 24, 28 and 29 form a continuous and smooth surface and define a cylindrically concave recess transverse of the shaft 7. The flats 22, 23, 31, 32, 33 and 34 may be formed so as to be coplanar, as shown in Fig. 3. The adapter plate 11 has a first flat side 36 which, as shown in Fig. 1, abuts a bottom mounting surface 37 on channel member 8. On the side of the adapter plate 11 remote from flat side 36 there is formed a cylindrically convex bearing surface 38 which is complementary to the cylindrically concave bearing surfaces 24, 28 and 29.

As shown in Figs. 3 and 4, the concave bearing surfaces 24, 28 and 29 are cylindrically arcuate about a hypothetical axis which extends in the longitudinal direction of channel member 8 and at right angles to the axis of shaft 7. In the assembled condition of the parts as shown in Fig. 1, the cylindrically convex surface 38 of the abutment plate 11 cooperates with the cylindrically concave surfaces 24, 28 and 29 so as to secure the shaft 7 nonrotatably to channel member 8 and at the same time allow the shaft to tilt relative to the channel member. Such cooperation compensates for any normal warpage or distortion of the mounting surface 37 at the bottom of channel members 8 and prevents undue bending of the shaft 7 when the bracket 9 at the opposite ends of the shaft are drawn up tight against their respective channel members 8 and the bottom surfaces 37 of the latter are not perfectly coplanar.

The herein disclosed truck roller shaft mounting may be manufactured at less cost than a truck roller shaft mounting of conventional type, but in which the undersides of the channel members are machined so as to provide coplanar mounting surfaces. Even if the mounting surfaces 37 on channel members 8 were machined so as to be coplanar, distortion of the channel members under the extremely severe working conditions of a crawler tractor may ultimately result in objectionable bending of the truck roller shafts.

By providing the herein disclosed shaft mounting, bending of the shaft due to mounting its supporting brackets on noncoplanar channel member mounting surfaces is prevented and antifriction bearings are not unnecessarily subjected to loads additional to the load imparted to them through the truck roller which they carry. Also, premature failure of the shaft will be avoided due to the fact that it is not as greatly stressed.

The cooperation between the convex bearing surface 38 on the abutment plate 11 and the concave bearing surface 24 on the shaft 7 holds the shaft 7 not only against rotation on its axis, but also against axial displacement, and the shaft thereby additionally serves to brace the two supporting channels relative to each other.

From the foregoing it is seen that an improved truck roller shaft mounting for self-laying track units is provided in which the truck roller shaft 7 is nonrotatably secured to an elongated, rolled section track frame member 8, only a portion of which is shown, and in which the shaft 7 is mounted on the support or track frame member 8 so that it may adjust its position about an axis disposed in the longitudinal direction of the track frame member 8 to compensate for misplacement of the mounting surface 37. This shaft mounting arrangement allows a shaft to be securely mounted on a pair of noncoplanar supporting surfaces without deflecting the shaft. Use of this mounting allows rolled section channels to be used in the track frame for supporting the truck rollers without machining their bottom sides, and at the same time allows mounting of the shaft without subjecting it to undesirable bending forces.

The shaft mounting of this invention may comprise a support, a shaft element having an end bearing portion 19 on which is formed a concave bearing surface 24 cylindrically formed about an axis (not shown) at right angles to the axis of the shaft, an adapter element in the form of an adapter plate 11 having a convex bearing surface 38 disposed in complementary and thrust transmitting relation to concave bearing surface 24, and releasable fastening means in the form of a bracket and bolts means (bolts 12 and nuts 13) operatively associated with and retaining the adapter element, shaft element and support in cooperating thrust transmitting relation to one another.

Generally, the herein disclosed shaft mounting comprises a support 8; an adapter 11 disposed at one side (surface 37) of said support, which presents a cylindrically arcuate bearing face 38 on its side opposite said one side (37) of the support 8; a shaft 7 having an attaching portion 19 in overlapping relation to the support 8 at said one side (37) of the latter; a bracket 9 connected with the attaching portion 19 of the shaft 7 at said one side (37) of the support 8 and having cylindrically arcuate bearing surfaces 28 and 29 facing toward the bearing face 38 and in complementary thrust transmitting relation thereto, and releasable fastening means in the form of bolts 12 and nuts 13 operatively associated with and retaining the bracket 9, adapter 11 and support 8 in cooperating thrust transmitting relation to one another.

It should be understood that it is not intended to limit the invention to the particular forms and details described hereinabove and that the invention includes such other forms and modifications as are embraced by the scope of the appended claims.

It is claimed and desired to secure by Letters Patent:

1. In combination: a support; an adapter disposed at one side of said support and presenting a cylindrically arcuate symmetrical bearing face on its side remote from said one side of said support; a shaft having an attaching portion in overlapping relation to said support, said attaching portion presenting a cylindrically arcuate bearing surface complementary to and in thrust transmitting relation to said bearing face; a bracket connected with said attaching portion of said shaft and presenting a pair of cylindrically arcuate bearing surfaces complementary to and in thrust transmitting relation to said bearing face, said bearing surfaces formed on said shaft and bracket lying in a surface generally symmetrical about a plane disposed at right angles to the axis of said shaft; and releasable fastening means for securing said support, adapter, shaft and bracket in cooperating thrust transmitting relation to one another, said fastening means including a fastening element for maintaining said support, adapter and bracket in assembly.

2. The combination set forth in claim 1, in which said bearing face is convex and said bearing surfaces are concave.

3. The combination set forth in claim 2, in which said bearing face presented by said adapter and said bearing surface presented by said shaft cooperate to secure said shaft against axial movement.

4. A truck roller shaft mounting for self-laying track units comprising, in combination: a rolled section track frame member having a downwardly facing mounting surface; a truck roller shaft having an attaching portion disposed in underlying relation to said mounting surface; a bracket element connected with said attaching portion of said shaft; an adapter element operatively interposed between said bracket element and said mounting surface of said track frame member, one of said bracket and adapter elements presenting a concave bearing surface and the other of said elements presenting a convex bearing surface, said bearing surfaces lying between said shaft and said mounting surface of said track frame member in cooperating thrust transmitting relation to one another; and releasable fastening means operatively associated with and securing said bracket element, adapter element and track frame member in cooperating thrust transmitting relation to one another.

5. The shaft mounting set forth in claim 4 in which said bearing surfaces are cylindrically formed on an axis disposed in a plane at right angles to the axis of said shaft.

6. The shaft mounting set forth in claim 5 in which said adapter element presents said convex bearing surface and said bracket element presents said concave bearing surface.

7. A truck roller shaft mounting for self-laying track units comprising, in combination: an elongated rolled section track frame member having a downwardly facing mounting surface; an adapter having a first side in thrust transmitting relation to said mounting surface and having a cylindrically arcuate bearing face formed on a second side remote from said first side; a truck roller shaft having an attaching portion in underlying relation to said mounting surface of said truck frame member, said attaching portion presenting a cylindrically arcuate bearing surface complementary to and in thrust transmitting relation to said bearing face; a bracket connected with said attaching portion of said shaft and presenting a pair of cylindrically arcuate bearing surfaces complementary to and in thrust transmitting relation to said bearing face; said bearing surfaces formed on said bracket and shaft lying in a surface generally symmetrical about a plane disposed at right angles to the axis of said shaft; and releasable fastening means for securing said bearing surfaces on said shaft and bracket in cooperating thrust transmitting relation with said bearing face on said adapter and for securing said first side of said adapter in thrust transmitting relation with said mounting surface of said track frame member, said fastening means including a fastening element for maintaining said bracket, adapter and track frame member in assembly.

8. The shaft mounting set forth in claim 7 in which said bearing face is convex and said bearing surfaces are concave.

9. The shaft mounting set forth in claim 7 in which said releasable fastening means comprise bolt means operable to draw said bracket toward said mounting surface of said track frame member.

References Cited in the file of this patent

UNITED STATES PATENTS

| | | |
|---|---|---|
| 2,568,897 | Norelius | Sept. 25, 1951 |
| 2,597,548 | Traylor | May 20, 1952 |